United States Patent
Shen et al.

(10) Patent No.: US 9,817,431 B2
(45) Date of Patent: Nov. 14, 2017

(54) FRAME BASED CLOCK RATE ADJUSTMENT FOR PROCESSING UNIT

(71) Applicant: QUALCOMM Incorporated, San Diego, CA (US)

(72) Inventors: Qiao Shen, San Diego, CA (US); Song Zhao, Richmond Hill (CA); Navid Farazmand, Marlborough, MA (US); Eduardus Antonius Metz, Unionville (CA)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/014,727

(22) Filed: Feb. 3, 2016

(65) Prior Publication Data

US 2017/0220062 A1  Aug. 3, 2017

(51) Int. Cl.
| | | |
|---|---|---|
| *G06F 1/04* | (2006.01) | |
| *G06F 1/08* | (2006.01) | |
| *G06F 1/14* | (2006.01) | |
| *G06T 1/20* | (2006.01) | |
| *G06F 1/32* | (2006.01) | |

(52) U.S. Cl.
CPC .............. *G06F 1/08* (2013.01); *G06F 1/14* (2013.01); *G06F 1/324* (2013.01); *G06F 1/3265* (2013.01); *G06T 1/20* (2013.01)

(58) Field of Classification Search
CPC ............... G06F 1/08; G06F 1/14; G06T 1/20
See application file for complete search history.

(56) References Cited

U.S. PATENT DOCUMENTS

| | | | | |
|---|---|---|---|---|
| 7,075,541 | B2* | 7/2006 | Diard | G06T 15/005 |
| | | | | 345/502 |
| 8,411,095 | B2* | 4/2013 | Samson | G06F 1/3203 |
| | | | | 345/501 |
| 8,495,397 | B2* | 7/2013 | Yu | G06F 1/206 |
| | | | | 713/300 |
| 8,732,488 | B1 | 5/2014 | Gu et al. | |
| 8,856,566 | B1 | 10/2014 | Jane | |
| 8,924,752 | B1 | 12/2014 | Law et al. | |
| 2009/0309885 | A1 | 12/2009 | Samson et al. | |
| 2011/0145617 | A1* | 6/2011 | Thomson | G06F 1/3203 |
| | | | | 713/323 |
| 2013/0328890 | A1 | 12/2013 | Avkarogullari et al. | |
| 2014/0184620 | A1 | 7/2014 | Mondjak et al. | |

(Continued)

OTHER PUBLICATIONS

International Search Report and Written Opinion from International Application No. PCT/US2016/066993 dated Apr. 10, 2017, 13 pp.

(Continued)

*Primary Examiner* — Mark Connolly
(74) *Attorney, Agent, or Firm* — Shumaker & Sieffert, P.A.

(57) ABSTRACT

Techniques are described in which a processor determines how busy a graphics processing unit (GPU) was in rendering a current fame based on a time interval between when the GPU completed the rendering of the current frame and when the GPU completed the rendering of a previous frame that immediately precedes the current frame. The processor sets a clock rate of the GPU based on the determination of how busy the GPU was in rendering the current frame.

27 Claims, 5 Drawing Sheets

(56) References Cited

U.S. PATENT DOCUMENTS

2015/0066433 A1* 3/2015 Nagarajan .............. G09G 3/006
  702/186
2015/0185803 A1    7/2015 Salsbery et al.
2016/0358299 A1* 12/2016 Toth ......................... G06T 1/20

OTHER PUBLICATIONS

Response to Written Opinion from International Application No. PCT/US2016/066993 dated Sep. 6, 2017, 17 pp.

* cited by examiner

FRAME BASED CLOCK RATE ADJUSTMENT FOR PROCESSING UNIT

TECHNICAL FIELD

This disclosure relates to clock rate adjustment, and more particularly, to clock rate adjustment of a graphic processing unit (GPU).

BACKGROUND

Mobile devices are powered by batteries of limited size and/or capacity. Typically, mobile devices are used for making phone calls, checking email, recording/playback of a picture/video, listening to radio, navigation, web browsing, playing games, managing devices, and performing calculations, among other things. Many of these actions utilize a graphics processing unit (GPU) to perform some tasks. Example GPU tasks include the rendering of content to a display and performing general compute computations (e.g., in a general purpose GPU (GPGPU) operation). Therefore, the GPU is typically a large consumer of power in mobile devices. As such, it is beneficial to manage the power consumption of the GPU in order to prolong battery life.

SUMMARY

In general, the disclosure describes techniques for proactively adjusting a frequency of a clock signal of a graphics processing unit (GPU). In some examples, a central processing unit (CPU) determines a time interval between when the GPU completed the rendering of one frame and when the GPU completed the rendering of the immediately preceding frame. The CPU also determines how busy the GPU was during this time interval, and determines the frequency of the clock signal of the GPU based on the determination of how busy the GPU was during the time interval. In this way, the CPU may quickly determine frequency of the clock signal based on busy level for a single frame instead of waiting for multiple frames to be processed before determining the frequency of the clock signal.

In one example, the disclosure describes a method of clock rate determination comprising determining, with a processor, a first time instance when a graphics processing unit (GPU) completed rendering a first frame, determining, with the processor, a second time instance when the GPU completed rendering a second frame that immediately precedes the first frame, determining, with the processor, a time interval based on the first time instance and the second time instance, determining, with the processor, a busy level of the GPU for rendering the first frame during the time interval, and setting a clock rate of the GPU based on the determined busy level In one example, the disclosure describes a device for clock rate determination comprising memory configured to store graphics data that is used by a graphics processing unit (GPU) for rendering a first frame and a second frame, and a processor comprising integrated circuitry, the processor configured to determine a first time instance when the GPU completed rendering the first frame, determine a second time instance when the GPU completed rendering the second frame, determine a time interval based on the first time instance and the second time instance, determine a busy level of the GPU for rendering the first frame during the time interval, and set a clock rate of the GPU based on the determined busy level.

In one example, the disclosure describes a non-transitory computer-readable storage medium storing instructions that when executed cause one or more processors to determine a first time instance when a graphics processing unit (GPU) completed rendering a first frame, determine a second time instance when the GPU completed rendering a second frame that immediately precedes the first frame, determine a time interval based on the first time instance and the second time instance, determine a busy level of the GPU for rendering the first frame during the time interval, and set a clock rate of the GPU based on the determined busy level.

In one example, the disclosure describes a device for clock rate determination comprising means for determining a first time instance when a graphics processing unit (GPU) completed rendering a first frame, means for determining a second time instance when the GPU completed rendering a second frame that immediately precedes the first frame, means for determining a time interval based on the first time instance and the second time instance, means for determining a busy level of the GPU for rendering the first frame during the time interval, and means for setting a clock rate of the GPU based on the determined busy level.

The details of one or more examples are set forth in the accompanying drawings and the description below. Other features, objects, and advantages will be apparent from the description, drawings, and claims.

DETAILED DESCRIPTION

Figure 1:
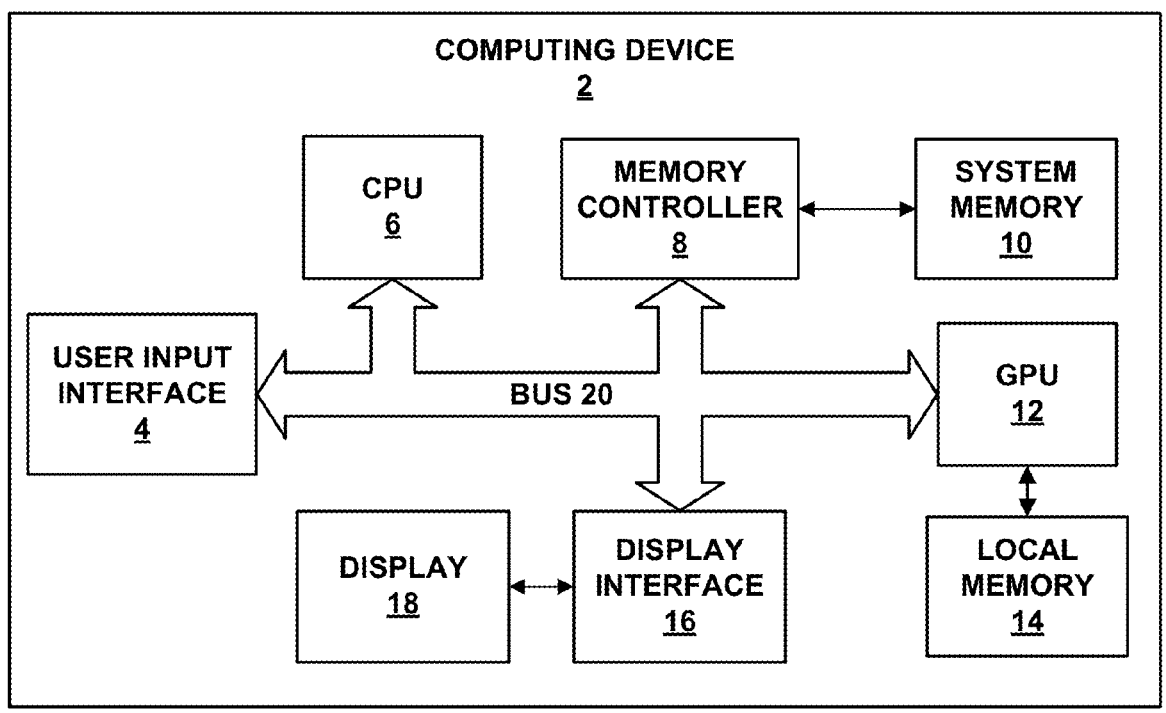
FIG. 1 is a block diagram illustrating an example device for processing data in accordance with one or more example techniques described in this disclosure.

A processing unit, such as a graphics processing unit (GPU), includes an internal clock that sets the rate at which the GPU processes instructions (e.g., sets the operation frequency of the GPU). A higher clock rate results in higher power consumption by the GPU, but allows the GPU to process more commands per second. In other words, a higher clock rate allows the GPU to provide higher performance, but at the cost of higher power consumption. A lower clock rate results in less power consumption by the GPU, but reduces the number of commands the GPU can process per second. In other words, a lower clock rate causes the GPU to provide lower performance, but at the benefit of lower power consumption. For instance, a voltage level applied to the GPU or an oscillator within the GPU sets the clock rate and a higher voltage level results in a higher clock rate, but more power consumption, and a lower voltage level results in a lower clock rate, and less power consumption.

In some examples, a host processor (e.g., central processing unit (CPU)) may determine the frequency at which the GPU should operate. As described above, operating at a higher frequency results in fast completion, but at the cost of extra power consumption. Accordingly, the host processor attempts to set the operation frequency of the GPU to keep power consumption low without impacting timely completion.

For ease of description, this disclosure describes the host processor determining the operation frequency (e.g., clock rate) of the GPU. However, the techniques described in this disclosure are not so limited and the example techniques may be applied on the GPU, as also described below.

This disclosure describes example ways in which to proactively adjust the clock rate of the GPU (e.g., adjust the operation frequency of the GPU) based on resources used by the GPU to render one frame. To determine the operation frequency, the host processor determines how busy (e.g., how many arithmetic units are operational) over a certain amount of time. As one example, the host processor may determine at set time intervals how busy the GPU was. As another example, the host processor may determine how busy the GPU was every time the GPU is idle (e.g., the time interval from when the GPU was idle the last time to the instance when the GPU was idle again). In some cases, although the amount of data the GPU is to process may be relatively constant, the GPU may not receive the data in regular intervals. Therefore, determining how busy the GPU is at set intervals or every time the GPU is idle may result in the host processor determining greatly fluctuating GPU operation frequency levels. In examples where the GPU determines its clock rate, the GPU may perform similar functions as those described above for the host processor, and like the host processor, the GPU may determine greatly fluctuating operation frequency levels.

In the techniques described in this disclosure, the host processor determines when the GPU has finished rendering a frame (e.g., every time the GPU completes processing a frame and reaches end of frame). The host processor then determines how busy the GPU was from the completion of the processing of the frame to the completion of the processing of the immediately previous frame. By measuring how busy the GPU is frame-to-frame, the host processor may more accurately determine the operation frequency of the GPU. In some examples, the GPU may determine how busy the GPU was from the completion of the processing of the frame to the completion of the processing of the immediately previous frame, and determine the operation frequency of the GPU.

There may be various ways in which the host processor may determine when the GPU completes processing a frame. As one example, the GPU may indicate to the host processor every time the GPU completes a task of the plurality of tasks need to process the frame. After completing the last task, the host processor may determine that the GPU is at the end of the frame. In some cases, after the GPU completes processing a frame, the host processor executes a function to swap buffers to free buffer space for the processing of the next frame. For instance, the function to swap buffers changes one frame buffer from read to write and other from write to read so that one is being written to while the other is being displayed. The function to swap buffers may be configured to include instructions from which the host processor can determine the end of frame.

In examples where the GPU sets its clock rate, the GPU (e.g., via a controller) may determine when the GPU completed processing of each frame. In response, the controller may determine how busy the GPU was frame-to-frame, and determine the clock rate based on the frame-to-frame busy time.

Because the example techniques may be implemented by a host processor, the GPU, or some combination of the host processor performing some functions and the GPU performing some functions, the techniques described in this disclosure may be considered as being performed by a processor. One example of the processor is the host processor (e.g., where the host processor determines the clock rate for the GPU and instructs the GPU to set the clock rate), one example of the processor is the GPU (e.g., where the GPU determines its own clock rate and sets the clock rate accordingly), and one example of the processor is a combination of the host processor and the GPU (e.g., where the host processor and GPU together determine the clock rate of the GPU and set the clock rate of the GPU).

Accordingly, a processor may determine a first time instance when the GPU completed processing a first frame and a second time instance when the GPU completed processing a second frame that immediately precedes the first frame. The processor may determine a time interval based on the first and second time instances, and determine a busy level of the GPU during the time interval. Based on the busy level, the processor set the clock rate of the GPU.

For example, the processor may determine an operation frequency (e.g., clock rate) of the GPU based on the busy level. In the example where the host processor determines the clock rate, the host processor may instruct the GPU to set the clock rate based on the determined clock rate. In the example where the GPU determines the clock rate, the GPU may set the clock rate based on the determined clock rate.

FIG. 1 is a block diagram illustrating an example computing device 2 that may be used to implement techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a local memory 14, a display interface 16, a display 18 and bus 20. User input interface 4, CPU 6, memory controller 8, GPU 12 and display interface 16 may communicate with each other using bus 20. Bus 20 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, an OpenCL API, a Direct3D API, an X3D API, a RenderMan API, a WebGL API, or any other public or proprietary standard graphics API. The techniques should not be considered limited to requiring a particular API.

In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadralaterals, triangle strips, etc.

Memory controller 8 facilitates the transfer of data going into and out of system memory 10. For example, memory controller 8 may receive memory read and write commands, and service such commands with respect to memory 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store user applications and graphics data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. In addition, system memory 10 may store command streams for processing by GPU 12. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 10 may include instructions that cause CPU 6 and/or GPU 12 to perform the functions ascribed in this disclosure to CPU 6 and GPU 12. Accordingly, system memory 10 may be a computer-readable storage medium having instructions stored thereon that, when executed, cause one or more processors (e.g., CPU 6 and GPU 12) to perform various functions.

In some examples, system memory 10 is a non-transitory storage medium. The term "non-transitory" indicates that the storage medium is not embodied in a carrier wave or a propagated signal. However, the term "non-transitory" should not be interpreted to mean that system memory 10 is non-movable or that its contents are static. As one example, system memory 10 may be removed from device 2, and moved to another device. As another example, memory, substantially similar to system memory 10, may be inserted into device 2. In certain examples, a non-transitory storage medium may store data that can, over time, change (e.g., in RAM).

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics commands may include, e.g., drawing commands such as a draw call, GPU state programming commands, memory transfer commands, general-purpose computing commands, kernel execution commands, etc. In some examples, CPU 6 may provide the commands and graphics data to GPU 12 by writing the commands and graphics data to memory 10, which may be accessed by GPU 12. In some examples, GPU 12 may be further configured to perform general-purpose computing for applications executing on CPU 6.

GPU 12 may, in some instances, be built with a highly-parallel structure that provides more efficient processing of vector operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6. In addition, the highly parallel nature of GPU 12 may allow GPU 12 to process certain types of vector and matrix operations for general-purpose computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 and CPU 6 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to local memory 14. Thus, GPU 12 may read data from and write data to local memory 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize system memory 10 via bus 20. Local memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

CPU 6 and/or GPU 12 may store rendered image data in a frame buffer that is allocated within system memory 10. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computing device 2 via a wired or wireless communications link. For instance, display 18 may be a computer monitor or flat panel display connected to a personal computer via a cable or wireless link.

As described, CPU 6 may offload graphics processing to GPU 12, such as tasks that require massive parallel operations. As one example, graphics processing requires massive parallel operations, and CPU 6 may offload such graphics processing tasks to GPU 12. However, other operations such as matrix operations may also benefit from the parallel processing capabilities of GPU 12. In these examples, CPU 6 may leverage the parallel processing capabilities of GPU 12 to cause GPU 12 to perform non-graphics related operations.

In the techniques described in this disclosure, a first processing unit (e.g., CPU 6) offloads certain tasks to a second processing unit (e.g., GPU 12). To offload tasks, CPU 6 outputs commands to be executed by GPU 12 and data that are operands of the commands (e.g., data on which the commands operate) to system memory 10 and/or directly to GPU 12. GPU 12 receives the commands and data, directly from CPU 6 and/or from system memory 10, and executes the commands. In some examples, rather than storing commands to be executed by GPU 12, and the data operands for the commands, in system memory 10, CPU 6 may store the commands and data operands in a local memory that is local to the IC that includes GPU 12 and CPU 6 and shared by both CPU 6 and GPU 12 (e.g., local memory 14). In general, the techniques described in this disclosure are applicable to the various ways in which CPU 6 may make available the commands for execution on GPU 12, and the techniques are not limited to the above examples.

The rate at which GPU 12 executes the commands is set by the frequency of a clock signal (also referred to as a clock rate or operation frequency of GPU 12). For example, GPU 12 may execute a command every rising or falling edge of the clock signal, or execute one command every rising edge and another command every falling edge of the clock signal. Accordingly, how often a rising or falling edge of the clock signal occurs within a time period (e.g., frequency of the clock signal) sets how many commands GPU 12 executes within the time period.

In some examples, such as those where CPU 6 stores commands to be executed by GPU 12 in memory (e.g., system memory 10 or a local memory), CPU 6 may output memory address information identifying a group of commands that GPU 12 is to execute. The group of commands that GPU 12 is to execute is referred to as submitted commands. In examples where CPU 6 directly outputs the commands to GPU 12, the submitted commands includes those commands that CPU 6 instructs GPU 12 to execute immediately.

There may be various ways in which CPU 6 may group commands. As one example, a group of commands includes all the commands needed by GPU 12 to render one frame. As another example, a group of commands may be so-called "atomic commands" that are to be executed together without GPU 12 switching to other commands. Other ways to group commands that are submitted to GPU 12 may be possible, and the disclosure is not limited to the above example techniques.

In some cases, GPU 12 may execute the submitted commands within a set time period. For instance, device 2 may be handheld device, where display 18 also functions as the user interface. As one example, to achieve a stutter free (also referred to as jank-free) user interface, GPU 12 may complete execution of the submitted commands within approximately 16 milliseconds (ms), assuming a frame rate of 60 frames per second (other time periods are possible). This 16 ms time period may be referred to as a "vsync" window, and if GPU 12 does not complete execution of the submitted commands within the vsync window, there may be "bubbles" in an execution pipeline of GPU 12 causing a jank filled user interface.

The "bubbles" in the execution pipeline of GPU 12 refers to conditions where units of GPU 12 that are executing the commands have partially completed the execution of the commands to produce some intermediate data, but units of GPU 12 that are to receive the intermediate data are still busy executing other commands causing the intermediate data to keep building. For instance, the execution pipeline of GPU 12 includes a series of units that each produce intermediate data that is further processed by the next unit in the series (i.e., in the pipeline). In some cases, upstream units of an execution pipeline of GPU 12 are producing intermediate data faster than downstream units of the execution pipeline of GPU 12 can consume, creating a so-called bubble.

The amount of commands that CPU 6 submits and the timing of when CPU 6 submits commands need not necessarily be constant. There may be an influx or reduction in the number of commands GPU 12 is to execute. For example, the application executing on CPU 6 (e.g., a third-party application) may increase or decrease the number of commands to be executed by GPU 12, or an operating system executing on CPU 6 (e.g., the framework itself) may increase or decrease the number of commands to be executed by GPU 12. As another example, CPU 6 may submit a first group of commands at time 0, a second group of commands at time 1, and a third group of commands at time 2. However, the time interval between the submission of the first group of commands and the second group of commands may be different than the time interval between the submission of the second group of commands and the third group of commands.

Because the amount of commands GPU 12 is to execute within a set time period (e.g., 16 ms) may change, the frequency of the clock signal of GPU 12 (i.e., the clock rate of GPU 12 or the operation frequency of GPU 12) may need to increase or decrease so that GPU 12 is able to execute the commands within the set time period, without unnecessarily increasing power consumption. The amount of commands GPU 12 needs to execute within the set time period may change because there are more or fewer commands in a group of commands that need to be executed within the set time period, because there is an increase or decrease in the number of groups of commands that need to be executed within the set time period, or a combination of the two.

If the frequency of the clock signal were permanently kept at a relatively high frequency, then GPU 12 would be able to timely execute the submitted commands in most instances. However, executing commands at a relatively high frequency causes the power consumption of GPU 12 to increase (e.g., more electrical power is needed to drive GPU 12 at a higher clock rate). If the frequency of the clock signal were permanently kept at a relatively low frequency, then the power consumption of GPU 12 may be reduced (e.g., less electrical power is needed to drive GPU 12 at a lower clock rate), but GPU 12 may not be able to timely execute submitted commands in most instances, leading to janky behavior and possibly other unwanted effects.

The techniques described in this disclosure describe example ways in which to proactively increase or decrease the clock rate (i.e., frequency of the clock signal) of GPU 12 based on the usage of GPU 12 over a particular time interval. One example of the time interval used to determine the clock rate of GPU 12 is the time interval between when GPU 12 completed the rendering of a current frame and when GPU 12 completed the rendering of a previous frame that immediately precedes the current frame. The completion of rendering of a frame, as used in this disclosure, refers to GPU 12 executing all commands needed to render the frame, including but not necessarily always including, commands to store the rendered frame in system memory 10. For example, the completion of rendering of a frame may be considered as the instance when GPU 12 determined the pixel value of the last pixel of the frame or when GPU 12 wrote the pixel value of the last pixel of the frame to system memory 10.

A frame, as used in this disclosure, refers to a full image, but may be a portion of the full image in some examples, that can be presented. For example, there may be a static background that is not re-rendered each time, but the frame rendered by GPU 12 may be composited (e.g., by display interface 16) with the static background to generate the full image. As another example, display interface 16 may combine video and the frame rendered by GPU 12.

The frame includes a plurality of pixels that represent graphical content, with each pixel having a pixel value. For instance, after GPU 12 renders a frame, GPU 12 stores the resulting pixel values of the pixels of the frame in a frame buffer, which may be in system memory 10. Display interface 16 receives the pixel values of the pixels of the frame from the frame buffer and outputs values based on the pixel values to cause display 18 to display the graphical content of the frame. In some examples, display interface 16 causes display 18 to display frames at a rate of 60 frames per second (fps) (e.g., a frame is displayed approximately every 16.67 ms).

In the following description, the example techniques are described with respect to CPU 6 determining a busy level of GPU 12 and setting a clock rate of GPU 12. However, such techniques may also be implemented by GPU 12 or CPU 6 and GPU 12 together.

To ensure that GPU 12 is operating at a high enough operation frequency to ensure that the 60 fps requirement is met, but not too high, CPU 6 may determine a busy level of GPU 12, which indicates how busy GPU 12 was to render a frame. The busy level refers to the amount of time GPU 12 was executing commands to render the frame during the time interval. Considered another way, the busy level indicates how many GPU cycles (e.g., clock cycles of GPU 12) were used during the time interval to render the frame. The busy level measurement may be in units of time, and may be sometimes represented as a percentage (e.g., amount of time busy divided time interval multiplied by 100). In general, the busy level refers to the amount of time it takes GPU 12 to complete a frame workload.

GPU 12 may include circuitry that increments a counter every time a unit within GPU 12 stores data to and/or reads data from one or more general purpose registers (GPRs). At the conclusion of the time interval (e.g., after GPU 12 completes the rendering of the frame), CPU 6 may determine the number of times the units within GPU 12 accessed the one or more GPRs to render the frame. For instance, CPU 6 may determine the difference between counter value at the end of completing the rendering of the immediately preceding frame and the counter value at the end of completing the rendering of the current frame to determine the number of times the units within GPU 12 accessed the one or more GPRs to render the frame.

The number of times the units with GPU 12 accessed the one or more GPRs may be a good approximation of the number of clock cycles used to render the frame. Based on the clock rate of GPU 12 during the rendering of the frame and the number of clock cycles used to render the frame, CPU 6 may determine the amount of time that GPU 12 was busy during the rendering of the frame. For instance, the number of clock cycles used to render the frame multiplied by the period of clock rate of GPU 12 indicates the amount of time that GPU 12 was busy during the rendering of the frame (e.g., busy level of GPU 12 for rendering the frame).

As another example, GPU 12 may include circuitry that increments a counter, with the clock cycle of GPU 12, as long as any GPU sub-block (e.g., unit within GPU 12) is busy. The value in the counter is indicative of the number of clock cycles used to render the frame.

The above is two example ways in which CPU 6 determines the busy level of GPU 12. The techniques described in this disclosure are not limited to this specific example which to determine the busy level of GPU 12. There may be multiple different ways to determine the busy level of GPU 12, and CPU 6 may employ one or more of the different ways to determine the busy level of GPU 12.

CPU 6 may divide the amount of time that GPU 12 was busy rendering the current frame with the amount of time in the time interval to determine a busy level percentage of GPU 12. In some examples, CPU 6 may divide the amount of time that GPU 12 was busy for rendering the current frame with an average amount of time for a previous N number of time intervals to determine the busy level percentage of the GPU 12. In either example, the busy level percentage is based on the busy level of the current frame and not based on the busy level of any other frame (e.g., how busy GPU 12 was in rendering only the current frame).

CPU 6 may then determine whether to increase or decrease the clock rate of GPU 12. For example, if the busy level percentage was greater than a first threshold, CPU 6 may increase the clock rate of GPU 12 and if the busy percentage was less than a second threshold, CPU 6 may decrease the clock rate of GPU 12. The first threshold and second threshold may be different thresholds or the same threshold. In some examples, there may be multiple thresholds from which CPU 6 can determine how much to increase or decrease the clock rate of GPU 12.

In some examples, rather than CPU 6 or in combination with CPU 6, GPU 12 may determine the time interval between when GPU 12 completed the rendering of a current frame and when GPU 12 completed the rendering of a previous frame that immediately precedes the current frame. For example, a controller of GPU 12 may read from the example counters described above to determine how busy GPU 12 was during the rendering of frame with an average amount of time GPU 12 was busy for rendering a pervious N number of time intervals. The controller of GPU 12 may then increase or decrease the clock rate similar to the above example described with respect to CPU 6.

By determining the busy level based on end-of-frame to end-of-frame (e.g., the time interval between when GPU 12 completed the rendering of a current frame and when GPU 12 completed the rendering of a previous frame that immediately precedes the current frame), CPU 6 and/or GPU 12 may determine the clock rate of GPU 12 relatively quickly and relatively accurately. In some techniques, rather than determining the time interval, over which CPU 6 and/or GPU 12 determines the busy level or busy level percentage, based on end-of-frame to end-of-frame, CPU 6 may determine the time interval based on instances when GPU 12 is idle.

However, determining busy level or busy level percentage based on when GPU 12 is idle or based on a present time interval may require averaging multiple busy levels or busy level percentages to determine an accurate busy level or busy level percentage. Determining the busy level or busy level percentage as an average value requires CPU 6 to wait for GPU 12 to render multiple frames because CPU 6 can determine the clock rate of GPU 12. Waiting for GPU 12 to render multiple frame results in a long delay to determine the busy level or busy level percentage, and delays the clock rate adjustment of GPU 12, which may lead to janky behavior.

For instance, GPU 12 is considered to be idle if GPU 12 does not output any graphics data for a threshold amount of time. In some examples, CPU 6 monitors access by GPU 12 to storage locations to which GPU 12 stores pixel values to determine that no graphics data has been outputted for a threshold amount of time. In response, CPU 6 reads from counters, as described above, to determine the busy level and busy level percentage. For instance, CPU 6 determines the difference in the counters from the last time GPU 12 was idle to the current instance where GPU 12 is idle (e.g., the idle-to-idle time).

However, because when GPU 12 becomes idle and the number of frames processed between times when GPU 12 becomes idle may be relatively random, relying on instances of when GPU 12 becomes idle may not be beneficial in all circumstances. For example, many times, one frame immediately follows another frame, meaning that there is a relatively large gap between idle-to-idle time of GPU 12. If only one frame is rendered in between idle-to-idle time of GPU 12, then the idle-to-idle time may be relative short.

This results in fluctuating busy level percentages, even if the workload of each of the frames is the same. To balance out the fluctuations, CPU 6 may average busy level percentages over multiple idle-to-idle time intervals, which delays when the clock rate of GPU 12 is set. Also, if there is a long delay before there is an idle (e.g., because of multiple frames being rendered with no idle time in between), CPU 6 may be delayed in determining the clock rate for GPU 12.

In addition, in some cases, there may be idle time within the processing of a frame. For example, the manner in which CPU 6 may submit commands to GPU 12 to render a frame may include scenarios where CPU 6 submits a plurality of the commands to the GPU to render the frame, and then there is a portion during which CPU 6 submits no additional commands, and then after the portion, CPU 6 submits the remaining commands to the GPU to render the frame. In this case, during this portion in between the submission of commands, GPU 12 may be idle. There may be more idle time than just one instance where GPU 12 is idle during a portion of rendering the frame. This idle time that happens when GPU 12 is in the process of rendering a frame may trigger CPU 6 to determine the clock rate, which may be based on insufficient information as GPU 12 is still rendering the frame.

The delay in determining the clock rate means that GPU 12 is not quickly reacting to changes in amount of commands GPU 12 needs to execute. For example, if the clock rate of GPU 12 does not ramp up in response to an increase in the workload, there may be jank in the user interface displayed on display 18 due to frames potentially being dropped. If the clock rate of GPU 12 does not ramp down in response to a decrease in the workload, GPU 12 may waste power. In some cases, there may be 200 to 800 ms delay in stepping down the clock rate of GPU 12 after there is a reduction in workload, during which the power consumed by GPU 12 is unnecessarily greater than it should be.

With the techniques described in this disclosure, CPU 6 may rely on information relating to the rendering of a single frame to determine the clock rate, which allows CPU 6 to determine the clock rate of GPU 12 without needing multiple measurements of the busy level or busy level percentage. Also, because CPU 6 uses the end-of-frame to trigger when to determine the busy level or busy level percentage, even if there are back-to-back frames with no idle time or if there is idle time in the middle of rendering a frame, there may be little to no effect on the busy level or busy level percentage determination. In some examples, GPU 12 may implement similar techniques to determine its own clock rate, rather than CPU 6 determining the clock rate of GPU 12.

To determine when GPU 12 finished rendering a frame, CPU 6 may receive information from GPU 12 that CPU 6 uses to determine that GPU 12 finished rendering a frame (e.g., outputted the pixel value of the last pixel of the frame). As one example, as part of the OpenGL API, at the conclusion of rendering a frame, GPU 12 may request for memory space in system memory 10 for rendering the next frame. To request the memory space, GPU 12 may output a request to CPU 6 for the memory space, and CPU 6 may use reception of this memory request to determine that GPU 12 completed rendering of a frame. For instance, GPU 12 executes a gl.SwapBuffer API to output a request for memory space. As an example, the gl.SwapBuffer may change a buffer from write to read and another buffer from read to write, but other ways in which to request for memory space is possible. CPU 6 uses the reception of the request to determine that GPU 12 completed rendering of a frame.

As another example, the software toolkit of GPU 12 may include a user mode driver (UMD) that a developer programs GPU 12 to call at the completion of rendering a frame, and the execution of the UMD causes GPU 12 to output an end-of-frame marker. CPU 6 uses the end-of-frame marker to determine that GPU 12 completed the rendering of a frame. As another example, the gl.SwapBuffer API may be updated with the UMD directly so that CPU 6 receives the end-of-frame marker based on the gl.SwapBuffer API and does not need developer intervention.

Other techniques for CPU 6 to determine that GPU 12 completed the rendering of a frame are possible and the techniques described in this disclosure should not be considered limited to the above examples. Furthermore, in examples where GPU 12 determines the end of frame-to-end of frame time interval, a controller of GPU 12 may determine when GPU 12 executed the gl.SwapBuffer API or when the UMD is executed. In such cases, the controller may determine that GPU 12 reached the end of frame.

In the techniques described in this disclosure, a processor (e.g., CPU 6 also referred to as a host processor, GPU 12, or a combination of the two) may determine a first time instance when GPU 12 completed rendering a first frame and determine a second time instance when GPU 12 completed rendering a second frame that immediately precedes the first frame. The first time instance is the instance when GPU 12 determined pixel values of a last pixel of the current frame or the instance when GPU 12 outputted the pixel values of the last pixel of the current frame. The second time instance is the instance when GPU 12 determined pixel values of a last pixel of the previous frame or the instance when GPU 12 outputted the pixel values of the last pixel of the current frame.

In some cases, GPU 12 may have been idle for at least a portion during the rendering of the current frame. For instance, from the time that GPU 12 started the rendering of the first frame, GPU 12 may not continuously render the frame, and may be idle for some time. After being idle for the portion, GPU 12 may continue the rendering of the first frame, and then indicates to CPU 6 when rendering the first frame is complete or determines (e.g., via a controller) when rendering of the first frame is complete.

In some cases, there may be no idle time in between the previous and current frame. For instance, CPU 6 may instruct GPU 12 to render the second, previous frame and then immediately instruct GPU 12 to render the first, current frame. In this example, GPU 12 begins rendering the first frame immediately after completion of rendering the second frame such that there is no GPU 12 idle time between rendering the second frame and rendering the first frame.

CPU 6 may determine the first time instance and the second time instance based on receiving a request for memory for rendering a next frame. Similarly, GPU 12 may determine the first time instance and the second time instance based on when a request for memory for rendering the next frame was transmitted. In this way, the processor may determine the first time instance and the second time instance prior to GPU 12 becoming idle, and essentially immediately after completing the rendering of the previous or current frame. For example, the processor may determine that GPU 12 finished rendering the second frame or the first frame less than 5 ms, 2 ms, or even possibly less than 1 ms from when GPU 12 finished rendering the second (previous) frame or the first (current) frame (e.g., in less time than the time it takes CPU 6 to determine that GPU 12 is idle).

The processor (e.g., CPU 6 and/or GPU 12) may determine a time interval based on the first time instance and the second time instance (e.g., a difference between the time for the first time instance and the time of the second time instance). The processor may determine a busy level of GPU 12 for rendering the current frame during the time interval (e.g., amount of time to process the workload for rendering the frame during the time interval).

Based on the determined busy level, the processor may determine a clock rate of GPU 12. For example, the processor may determine a busy level percentage based on the determined busy level and the determined time interval (e.g., divide amount of time to process the workload during the time interval with the amount of time of the time interval). The processor may compare the busy level percentage to a threshold and determine the clock rate based on the comparison.

As another example, the processor may average the time interval and one or more previous time intervals to determine an average time interval. In this example, each of the one or more previous time intervals indicates time intervals between completion of rendering of respective previous frames. For example, the processor may average the time interval between rendering of current frame and previous frame, time interval between rendering of previous frame and frame immediately preceding previous frames, and so forth for N number of time intervals. Such averaging may be considered as a windowed running average.

The processor may determine a busy level percentage based on the determined busy level and the average time interval, and compare the busy level percentage to a threshold. Similar to above, the processor may determine the clock rate based on the comparison.

The processor may determine a clock rate of GPU 12 based on the determined busy level. In some examples, the processor may determine the clock rate of GPU 12 based on the determined busy level for rendering the first frame and no other frame. In this way, the processor is configured to determine the clock rate based on a single frame rather than after GPU 12 renders multiple frames, which allows GPU 12 to ramp up or ramp down its operation frequency with little delay so that GPU 12 operates at its lowest frequency level while still timely completing execution of commands.

The processor may set a clock rate of GPU 12 to the determined clock rate. For instance, in the example where the processor is CPU 6, CPU 6 may then instruct GPU 12 to set a clock rate of GPU 12 to the determined clock rate. In the example where the processor is GPU 12, the controller of GPU 12 may instruct GPU 12 to set a clock rate of GPU 12. GPU 12 may then operate at the determined clock rate. Although the processor determines the clock rate of GPU 12 based on the current frame which sets the clock rate for rendering subsequent frames, by using only one frame for determining the clock rate, the processor may immediately update the clock rate in the event the clock rate was incorrect because the processor may update the clock rate immediately after GPU 12 completes rendering of the next frame.

Figure 2:
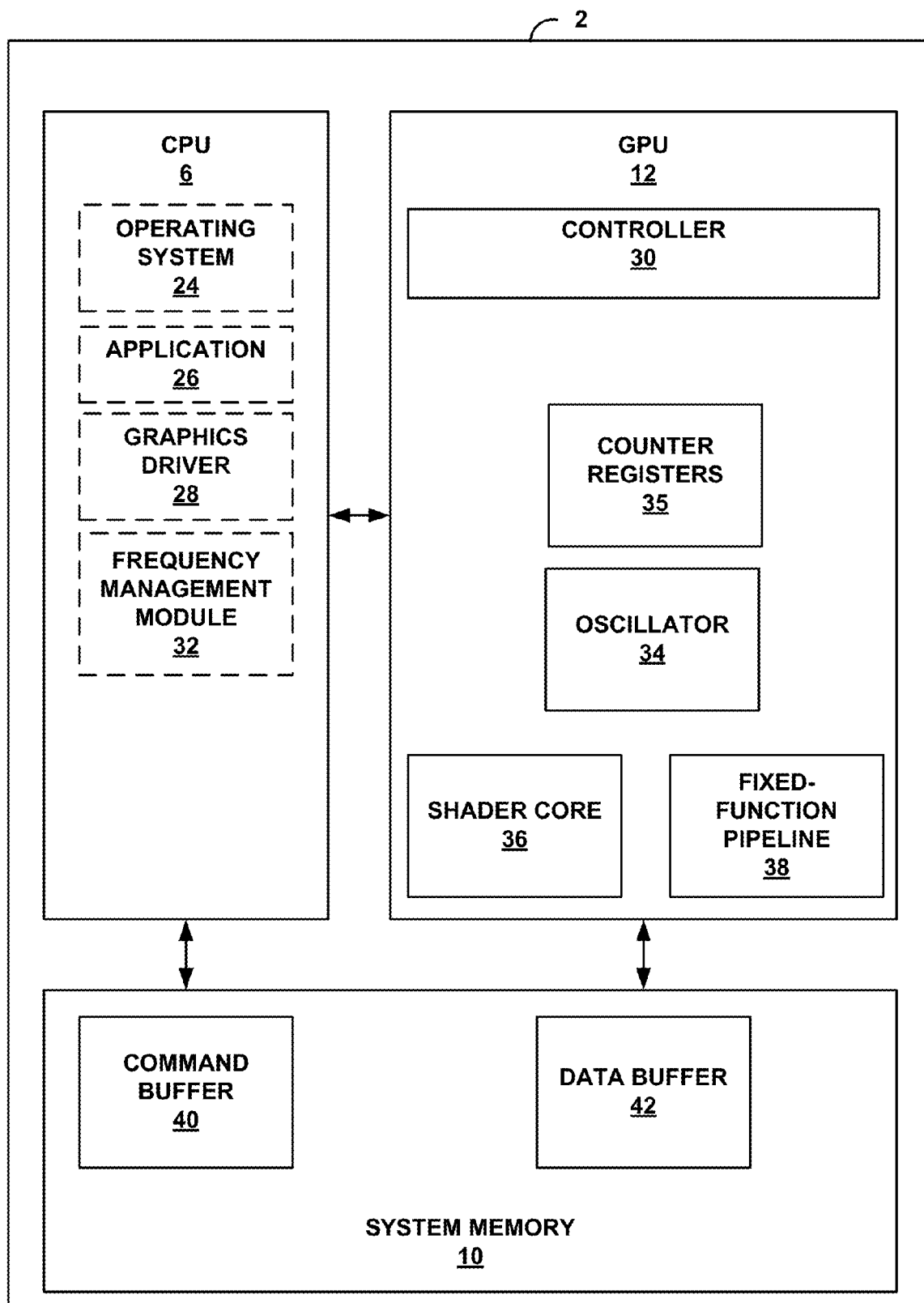
FIG. 2 is a block diagram illustrating components of the device illustrated in FIG. 1 in greater detail.

FIG. 2 is a block diagram illustrating components of the device illustrated in FIG. 1 in greater detail. As illustrated in FIG. 2, GPU 12 includes controller 30, oscillator 34, counter registers 35, shader core 36, and fixed-function pipeline 38. Shader core 36 and fixed-function pipeline 38 may together form an execution pipeline used to perform graphics or non-graphics related functions. Although only one shader core 36 is illustrated, in some examples, GPU 12 may include one or more shader cores similar to shader core 36.

The commands that GPU 12 is to execute are executed by shader core 36 and fixed-function pipeline 38, as determined by controller 30 of GPU 12. Controller 30 may be implemented as hardware on GPU 12 or software or firmware executing on hardware of GPU 12. Controller 30 is an example of the controller described above for performing the example techniques in cases where GPU 12 is determining the clock rate.

Controller 30 may receive commands that are to be executed for rendering a frame from command buffer 40 of system memory 10 or directly from CPU 6 (e.g., receive the submitted commands that CPU 6 determined should now be executed by GPU 12). Controller 30 may also retrieve the operand data for the commands from data buffer 42 of system memory 10 or directly from CPU 6. For example, command buffer 40 may store a command to add A and B. Controller 30 retrieves this command from command buffer 40 and retrieves the values of A and B from data buffer 42. Controller 30 may determine which commands are to be executed by shader core 36 (e.g., software instructions are executed on shader core 36) and which commands are to be executed by fixed-function pipeline 38 (e.g., commands for units of fixed-function pipeline 38).

In some examples, commands and/or data from one or both of command buffer 40 and data buffer 42 may be part of local memory 14 of GPU 12. For instance, GPU 12 may include an instruction cache and a data cache, which may be part of local memory 14, that stores commands from command buffer 40 and data from data buffer 42, respectively. In these examples, controller 30 may retrieve the commands and/or data from local memory 14.

Shader core 36 and fixed-function pipeline 38 may transmit and receive data from one another. For instance, some of the commands that shader core 36 executes may produce intermediate data that are operands for the commands that units of fixed-function pipeline 38 are to execute. Similarly, some of the commands that units of fixed-function pipeline 38 execute may produce intermediate data that are operands for the commands that shader core 36 is to execute. In this way, the received data is progressively processed through units of fixed-function pipeline 38 and shader core 36 in a pipelined fashion. Hence, shader core 36 and fixed-function pipeline 38 may be referred to as implementing an execution pipeline. In some examples, GPU 12 may include more than one shader core 36, and the example in FIG. 2 is provided to merely assist with understanding.

In general, shader core 36 allows for various types of commands to be executed, meaning that shader core 36 is programmable and provides users with functional flexibility because a user can program shader core 36 to perform desired tasks in most conceivable manners. The fixed-function units of fixed-function pipeline 38, however, are hardwired for the manner in which the fixed-function units perform tasks. Accordingly, the fixed-function units may not provide much functional flexibility.

As also illustrated in FIG. 2, GPU 12 includes oscillator 34. Oscillator 34 outputs a clock signal that sets the time instances when shader core 36 and/or units of fixed-function pipeline 38 execute commands. Although oscillator 34 is illustrated as being internal to GPU 12, in some examples, oscillator 34 may be external to GPU 12. Also, oscillator 34 need not necessarily just provide the clock signal for GPU 12, and may provide the clock signal for other components as well.

Oscillator 34 may generate a square wave, a sine wave, a triangular wave, or other types of periodic waves. Oscillator 34 may include an amplifier to amplify the voltage of the generated wave, and output the resulting wave as the clock signal for GPU 12.

In some examples, on a rising edge or falling edge of the clock signal outputted by oscillator 34, shader core 36 and each unit of fixed-function pipeline 38 may execute one command. In some cases, a command may be divided into sub-commands, and shader core 36 and each unit of fixed-function pipeline 38 may execute a sub-command in response to a rising or falling edge of the clock signal. For instance, the command of A+B includes the sub-commands to retrieve the value of A and the value of B, and shader core 36 or fixed-function pipeline 38 may execute each of these sub-commands at a rising edge or falling edge of the clock signal.

The rate at which shader core 36 and units of fixed-function pipeline 38 execute commands may affect the power consumption of GPU 12. For example, if the frequency of the clock signal outputted by oscillator 34 is relatively high, shader core 36 and the units of fixed-function pipeline 38 may execute more commands within a time period as compared the number of commands shader core 36 and the units of fixed-function pipeline 38 would execute for a relatively low frequency of the clock signal. However, the power consumption of GPU 12 may be greater in instances where shader core 36 and the units of fixed-function pipeline 38 are executing more commands in the period of time (due to the higher frequency of the clock signal from oscillator 34) than compared to instances where shader core 36 and the units of fixed-function pipeline 38 are executing fewer commands in the period of time (due to the lower frequency of the clock signal from oscillator 34).

As described above, CPU 6 may offload tasks to GPU 12 due to the massive parallel processing capabilities of GPU 12. For instance, GPU 12 may be designed with a single instruction, multiple data (SIMD) structure. In the SIMD structure, shader core 36 includes a plurality of SIMD processing elements, where each SIMD processing element executes same commands, but on different data.

A particular command executing on a particular SIMD processing element is referred to as a thread. Each SIMD processing element may be considered as executing a different thread because the data for a given thread may be different; however, the thread executing on a processing element is the same command as the command executing on the other processing elements. In this way, the SIMD structure allows GPU 12 to perform many tasks in parallel (e.g., at the same time). For such SIMD structured GPU 12, each SIMD processing element may execute one thread on a rising edge or falling edge of the clock signal.

To avoid confusion, this disclosure uses the term "command" to generically refer to a process that is executed by shader core 36 or units of fixed-function pipeline 38. For instance, a command includes an actual command, constituent sub-commands (e.g., memory call commands), a thread, or other ways in which GPU 12 performs a particular function. Because GPU 12 includes shader core 36 and fixed-function pipeline 38, GPU 12 may be considered as executing the commands.

Also, in the above examples, shader core 36 or units of fixed-function pipeline 38 execute a command in response to a rising or falling edge of the clock signal outputted by oscillator 34. However, in some examples, shader core 36 or units of fixed-function pipeline 38 may execute one command on a rising edge and another, subsequent command on a falling edge of the clock signal. There may be other ways in which to "clock" the commands, and the techniques described in this disclosure are not limited to the above examples.

Because GPU 12 executes commands every rising edge, falling edge, or both, the frequency of clock signal (also referred to as clock rate) outputted by oscillator 34 sets the amount of commands GPU 12 can execute within a certain time. For instance, if GPU 12 executes one command per rising edge of the clock signal, and the frequency of the clock signal is 1 MHz, then GPU 12 can execute one million commands in one second.

As illustrated in FIG. 2, CPU 6 executes application 26, as illustrated by the dashed boxes. During execution, application 26 generates commands that are to be executed GPU 12, including commands that instruct GPU 12 to retrieve and execute shader programs (e.g., vertex shaders, fragment shaders, compute shaders for non-graphics applications, and the like). In addition, application 26 generates the data on which the commands operate (i.e., the operands for the commands). CPU 6 stores the generated commands in command buffer 40, and stores the operand data in data buffer 42.

After CPU 6 stores the generated commands in command buffer 40, CPU 6 makes available the commands for execution by GPU 12. For instance, CPU 6 communicates to GPU 12 the memory addresses of a set of the stored commands and their operand data and information indicating when GPU 12 is to execute the set of commands. In this way, CPU 6 submits commands to GPU 12 for executing to render a frame.

As illustrated in FIG. 2, CPU 6 may also execute graphics driver 28. In some examples, graphics driver 28 may be software or firmware executing on hardware or hardware units of CPU 6. Graphics driver 28 may be configured to allow CPU 6 and GPU 12 to communicate with one another. For instance, when CPU 6 offloads graphics or non-graphics processing tasks to GPU 12, CPU 6 offloads such processing tasks to GPU 12 via graphics driver 28. For example, when CPU 6 outputs information indicating the amount of commands GPU 12 is to execute, graphics driver 28 may be the unit of CPU 6 that outputs the information to GPU 12.

As additional examples, application 26 produces graphics data and graphics commands, and CPU 6 may offload the processing of this graphics data to GPU 12. In this example, CPU 6 may store the graphics data in data buffer 42 and the graphics commands in command buffer 40, and graphics driver 28 may instruct GPU 12 when to retrieve the graphics data and graphics commands from data buffer 42 and command buffer 40, respectively, from where to retrieve the graphics data and graphics commands from data buffer 42 and command buffer 40, respectively, and when to process the graphics data by executing one or more commands of the set of commands.

Also, application 26 may require GPU 12 to execute one or more shader programs. For instance, application 26 may require shader core 36 to execute a vertex shader and a fragment shader to generate pixel values for the frames that are to be displayed (e.g., on display 18 of FIG. 1). Graphics driver 28 may instruct GPU 12 when to execute the shader programs and instruct GPU 12 with where to retrieve the graphics data from data buffer 42 and where to retrieve the commands from command buffer 40 or from other locations in system memory 10. In this way, graphics driver 28 may form a link between CPU 6 and GPU 12.

Graphics driver 28 may be configured in accordance to an application processing interface (API); although graphics driver 28 does not need to be limited to being configured in accordance with a particular API. In an example where device 2 is a mobile device, graphics driver 28 may be configured in accordance with the OpenGL ES API. The OpenGL ES API is specifically designed for mobile devices. In an example where device 2 is a non-mobile device, graphics driver 28 may be configured in accordance with the OpenGL API.

The amount of commands in the submitted commands may be based on the commands needed to render one frame of the user-interface or gaming application. For the user-interface example, GPU 12 may need to execute the commands needed to render one frame of the user-interface within the vsync window (e.g., time by when a new frame should be ready for display such as every 16 ms) to provide a jank-free user experience. If there is a relatively large amount of content that needs to be displayed, then the amount of commands may be greater than if there is a relatively small amount of content that needs to be displayed.

To ensure that GPU 12 is able to execute the submitted commands within the set time period, controller 30 may adjust the frequency (i.e., clock rate) of the clock signal that oscillator 34 outputs. However, to adjust the clock rate of the clock signal such that the clock rate is high enough to allow GPU 12 to execute the submitted commands within the set time period, controller 30 may receive information indicating whether to increase, decrease, or keep the clock rate of oscillator 34 the same. In some examples, controller 30 may receive information indicating a specific clock rate for the clock signal that oscillator 34 outputs.

In the techniques described in this disclosure where CPU 6 determines the clock rate of GPU 12, frequency management module 32 may be configured to determine the clock rate of the clock signal that oscillator 34 outputs. In some examples where GPU 12 determines the clock rate, controller 30 may be configured to perform the example techniques described with respect to frequency management module 32, but on GPU 12.

Frequency management module 32, also referred to as dynamic clock and voltage scaling (DCVS) module, is illustrated as being software executing on CPU 6. However, frequency management module 32 may be hardware on CPU 6 or a combination of hardware and software or firmware.

Frequency management module 32 may be configured to determine a first time instance when GPU 12 completed rendering a first (current) frame and a second time instance when GPU 12 completed rendering a second (previous) frame that immediately precedes the current frame. In this disclosure, the previous frame that immediately precedes the current frame refers to the frame that is prior to the current frame with no other frame being in between the previous frame and the current frame. In some cases, there may be some idle time between when GPU 12 completed rendering the previous frame to when GPU 12 started to render the current frame. However, in some examples, there may be no such idle time between when GPU 12 completed rendering the previous frame to when GPU 12 started rendering the current frame.

For instance, graphics driver 28 may submit, at one time, commands to render two frames. In this example, controller 30 receives commands to render the first of the two frames and instructs shader core 36 and fixed-function pipeline 38 to execute the commands. As the commands are proceeding through the graphics pipeline, as soon as the last command for rendering the first frame proceeds past the first unit in the graphics pipeline of GPU 12, controller 30 retrieves the first command to begin the execution of the second frame (e.g., instructs the first unit of the graphics pipeline of GPU 12 to being the execution of the commands for rendering the second frame). In this example, there is no pause in processing by GPU 12 between frames (e.g., no idle time between the rendering of two frames). In some cases, graphics driver 28 may submit, at one time, commands for more than two frames.

In some cases, graphics driver 28 may not necessarily submit all commands needed to render a frame to GPU 12 at one time or may submit all commands, but may not instruct GPU 12 to execute all commands immediately one after the other. For example, graphics driver 28 may submit a first set of commands for rendering the frame, and then pause in sending more commands during which time GPU 12 becomes idle, and then submit the remaining commands for rendering the frame. As another example, graphics driver 28 may submit all commands to GPU 12, then instruct GPU 12 to execute a first set of commands, then instruct GPU 12 to pause execution of the commands during which time GPU 12 becomes idle, and then instruct GPU 12 to execute the remaining instructions. There may be more than one duration during which GPU 12 becomes idle during the rendering of a frame, and the above examples where GPU 12 because idle for only one duration during the rendering of the frame is provided only for purposes of illustration.

As described above, the instances when GPU 12 completes rendering of the current frame or previous frame are the instances when GPU 12 determined pixel values of the last pixel of the current frame or previous frame, respectively, or the instances when GPU 12 outputted the pixel values of the last pixel of the current frame or previous frame, respectively. As one example, the instance when GPU 12 completes rendering of a frame (e.g., current or previous frame) is the instance of a last execution of a pixel shader on shader core 36 or the instance that the pixel shader executing on shader core 36 outputted the last pixel value of the frame.

One way in which frequency management module 32 determined that GPU 12 just finished rendering a frame (e.g., within 5 ms, 2 ms, or even 1 ms of rendering the frame) is based on reception of a request for memory in system memory 10. Although not illustrated, GPU 12 outputs the pixel values (e.g., graphics data) to a frame buffer within system memory 10. After rendering a frame, controller 30 executes a gl.SwapBuffer API to request from CPU 6 memory locations for where to store pixel values for the next frame. There may be a very high level of certainty that controller 30 will execute the gl.SwapBuffer API as this is the way in which GPU 12 is allocated memory for rendering the next frame.

In this example, controller 30 outputs the request for memory to graphics driver 28. Graphics driver 28 forwards the request to operating system 24 and frequency management module 32. Frequency management module 32, in turn determines the time instance that GPU 12 completed rendering the frame as the time instance frequency management module 32 received the request. Operating system 24 allocates memory for GPU 12 to output pixel values for the next frame.

As another example, controller 30 may execute a UMD (user mode driver) that causes controller 30 to output an end-of-frame marker to graphics driver 28, which then forwards the end-of-frame maker to frequency management module 32. As another example, the gl.SwapBuffer API may be updated with the UMD so no additional execution is needed other than the normal execution of the gl.SwapBuffer API.

In examples where controller 30 determines the clock rate of GPU 12, controller 30 may determine when the UMD or gl.SwapBuffer API were executed. Based on the execution, controller 30 may determine that GPU 12 completed rendering a frame, and based on the timing of the execution, controller 30 may determine the amount of time that passed between rendering of end of frame-to-end of frame.

Frequency management module 32 may determine a time interval based on the first time instance and the second time instance (e.g., first time instance minus second time instance). In addition frequency management module 32 may determine a busy level of GPU 12 for rendering the current frame during the time interval. Controller 30 may be configured to perform similar functions in examples where controller 30 determines its clock rate.

Every time controller 30, shader core 36, or fixed-function pipeline 38 reads data from or stores data to a general purpose register (GPR) within local memory 14, controller 30 may update (e.g., increment) a counter in counter register 35. Frequency management module 32 and/or controller 30 may have read counter register 35 after the rendering of the previous frame and may read counter register 35 after the rendering of the current frame. Frequency management module 32 and/or controller 30 may determine a difference between the two values read from counter registers 35, and the resulting value may be an approximation of the number of clock cycles of oscillator 34 it took GPU 12 to render the current frame. Frequency management module 32 and/or controller 30 may multiply the determined number of clock cycles with the time period of the clock rate of the clock signal that oscillator 34 was outputting during the rendering of the current frame to determine an amount of time GPU 12 was busy (e.g., busy level of GPU 12).

As another example, as long as any GPU sub-block of GPU 12 is busy, controller 30 may update (e.g., increment) a counter in counter register 35. As above, frequency management module 32 and/or controller 30 may have read counter register 35 after the rendering of the previous frame and may read counter register 35 after the rendering of the current frame. Frequency management module 32 and/or controller 30 may determine a difference between the two values read from counter registers 35, and the resulting value may be an approximation of the number of clock cycles of oscillator 34 it took GPU 12 to render the current frame. Also, as above, frequency management module 32 and/or controller 30 may multiply the determined number of clock cycles with the time period of the clock rate of the clock signal that oscillator 34 was outputting during the rendering of the current frame to determine an amount of time GPU 12 was busy (e.g., busy level of GPU 12). There may be various other ways in which to determine the GPU busy level, and the above provides two example techniques.

Frequency management module 32 and/or controller 30 may determine a clock rate of the clock signal that oscillator 34 outputs based on the determined busy level. In examples where CPU 6 sets the clock rate, frequency management module 32 may then cause graphics driver 28 to instruct controller 30 of GPU 12 to set a clock rate of the clock signal that oscillator 34 outputs to the determined clock rate. In examples where GPU 12 sets the clock rate, controller 30 may set the clock rate of the clock signal that oscillator 34 outputs. In this way, frequency management module 32 and/or controller 30 may determine the clock rate of the clock signal that oscillator 34 outputs based on the determined busy level for rendering the current frame and no other frame.

In one example, frequency management module 32 and/or controller 30 may determine a busy level percentage based on determined busy level and determined time interval (e.g., divide busy level with time interval multiply by 100).

Frequency management module 32 and/or controller 30 may compare the busy level percentage to a threshold, and determine the clock rate of the clock signal that oscillator 34 outputs based on the comparison.

In one example, frequency management module 32 and/or controller 30 may track the time intervals for rendering the current frame and time intervals for rendering one or more previous frames (e.g., for a total of 5 frames). Frequency management module 32 and/or controller 30 may determine an average of the time intervals (i.e., average frame time (AFT)). In this example, the initial frame time may be set to one vsync interval (default 16.67 ms, depending on refresh rate of display 18). The frames per second (FPS) may equal 1/AFT. The FPS of vsync-bound graphics applications is usually a constant value and AFT is relatively stable.

In this example, frequency management module 32 and/or controller 30 may determine the busy level percentage by dividing the busy level for rendering the current frame by the average frame time. Similar to above, frequency management module 32 and/or controller 30 may compare the busy level percentage to a threshold, and determine the clock rate of the clock signal that oscillator 34 outputs based on the comparison. Also, similar to above, frequency management module 32 and/or controller 30 may use the busy level for rendering only the current frame for determining the clock rate, but may use the time intervals of multiple pervious frames, in this example.

As described, frequency management module 32 and/or controller 30 may track frame boundaries for clock rate determination. For instance, frequency management module 32 and/or controller 30 determines busy level of GPU 12 (e.g., frame load of GPU 12) and end-of-frame to end-of-frame time interval (e.g., frame time or time interval from completion of rendering of previous frame and completion of rendering of current frame). Frequency management module 32 and/or controller 30 may use the request for memory or end-of-frame markers as timestamps for determining the busy level percentage and the duration over which frequency management module 32 and/or controller 30 determines the busy level of GPU 12 for rendering a frame.

In this way, frequency management module 32 and/or controller 30 may reduce latency to when clock rate determination is made to one frame time, as compared to other techniques that may require five or more frames to accurately determine the clock rate. Low latency and accurate determination of the clock rate results in smoother UI experience with less jank, and may be of particular use in cases where precise clock rate management is needed such as in concurrent use-cases. Also, with the techniques, the clock rate need not change gradually, but may jump if needed. For instance, if the clock rate is at 200 MHz, but the busy level percentage of GPU 12 is 300%, frequency management module 32 may instruct controller 30 to cause oscillator 34 or controller 30 may cause oscillator 34 to jump the clock rate to 600 MHz, bypassing the 300 MHz, 400 MHz, and 500 MHz clock rate options.

Furthermore, because the example techniques rely on the completion of rendering of a frame to determine the clock rate, even if there are one or more portions during the rendering of the frame that GPU 12 is idle, frequency management module 32 and/or controller 30 may not determine clock rate mid-frame rendering, and may wait until the frame is rendered prior to determining the clock rate. Also, because the techniques do not rely on idle times of GPU 12 to determine the clock rate, the techniques described in this disclosure may accurately and with low latency determine the clock rate even in instances where there is no idle times between rendering of frames, as compared to other techniques that rely on the idle times for determining when to determine the clock rate.

Figure 3A:
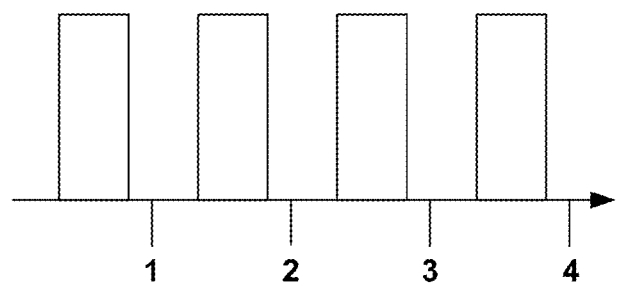
FIGS. 3A-3C are timing diagrams illustrating examples of a graphics processing unit (GPU) receiving commands for rendering frames.
Figure 3B:
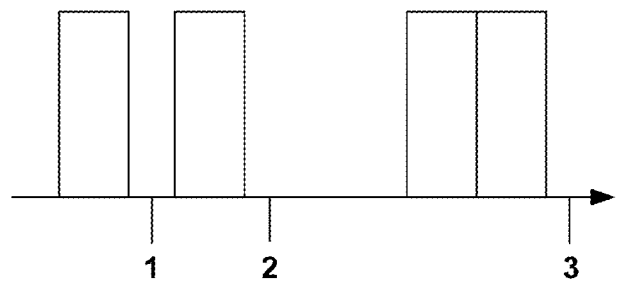
Figure 3C:
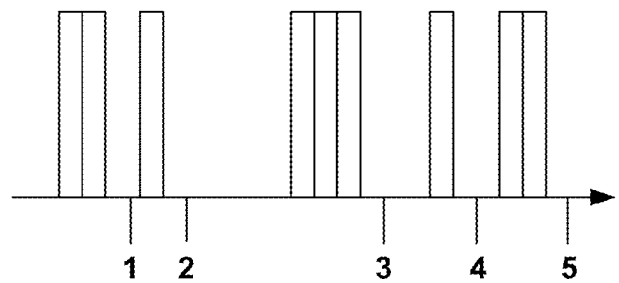

FIGS. 3A-3C are timing diagrams illustrating examples of GPU 12 receiving commands for rendering frames. FIGS. 3A-3C illustrate different sets of commands that GPU 12 receives for rendering frames. In the examples illustrated in FIGS. 3A-3C the actual busy level percentage of GPU 12 each time the busy level percentage is determined is the same (e.g., 50% busy level percentage); however, the determined busy level percentage may change. In FIGS. 3A-3C, the busy level percentage of GPU 12 is the busy level of GPU 12 divided by the time interval between two idles of GPU 12.

The numbers on the x-axis of FIGS. 3A-3C illustrate instances when the CPU 6 determines the busy level percentage. As illustrated, some time passes after GPU 12 completes rendering a frame before a determination is made that GPU 12 is idle. Accordingly, the time that CPU 6 determines the busy level percentage is after the rendering of the frame and not at or immediately after rendering the frame. In FIGS. 3A-3C sometime elapses after GPU 12 outputs the pixel values for the last pixel before the determination is made of the busy level percentage. As described above, determining busy level percentage based on times when GPU 12 is idle may require long delay before an accurate determination of the busy level percentage can be made.

For example, FIG. 3A illustrates an ideal case where GPU 12 render a frame and then there is a set time that GPU 12 is idle, then a set amount of time within which GPU 12 renders the next frame, followed by a set time that GPU 12 is idle, and so forth. In this example, the actual busy level percentage and the measurement busy level percentage track one another (e.g., both are 50%). However, ideal GPU traffic is rare.

FIG. 3B illustrates the case where the spacing between when GPU 12 is to render frames is not constant, unlike in FIG. 3A where it was constant. For instance, for the last two frames, there may be no idle time for GPU 12 between rendering frames. In this example, at sample 1 (e.g., shortly after first frame), CPU 6 may determine the busy level percentage to be 50%, which is the same as the actual busy level percentage. At sample 2 (e.g., shortly after second frame), CPU 6 may determine the busy level percentage to be 60% because the time interval was shorter but the amount of commands that are executed is the same (e.g., frame load is the same) for each frame. In this case, because there is no idle time between rendering frame 3 and frame 4, no sample is taken after rendering frame 3. At sample 3 (e.g., shortly after fourth frame), CPU 6 may determine the busy level percentage to be 40% because the amount of time interval may be much greater. The average of the three determined busy level percentage would be 50% (e.g., (50%+60%+40%) divided by 3), but four frames are processed before reaching 50%.

FIG. 3C illustrates the case where there is idle time during the rendering of a frame, during which time CPU 6 may determine the busy level percentage. In this example, at sample 1, CPU 6 may determine the busy level percentage as 50%, at sample 2, CPU 6 may determine the busy level percentage as 60%, at sample 3, CPU 6 may determine the busy level percentage at 30%, at sample 4, CPU 6 may determine the busy level percentage at 30%, and at sample 5, CPU 6 may determine the busy level percentage at 80%.

The average of the samples is 50%, but five samples are processed before reaching 50%.

Therefore, in FIGS. 3A-3C, even with constant busy level, the busy level percentage that CPU 6 determines may fluctuate if CPU 6 determines the busy level percentage at times when GPU 12 becomes idle. This may be because the inter-frame idle duration is not evenly distributed and/or because there may be idle time during a portion of the rendering of the frame. In some examples, CPU 6 may use a big sliding window of samples (e.g., 3 or 5 samples, as illustrated in FIGS. 3B and 3C) to filter out the fluctuations. However, in waiting for a big sliding window, there is large delay in setting the clock rate of the clock signal of oscillator 34 of GPU 12.

In the techniques described in this disclosure, because CPU 6 determines the clock rate at the completion of the rendering of a frame, rather than during idle times. Accordingly, the fluctuations may not be present, and CPU 6 may be able to determine the clock rate after rendering one frame instead of rendering multiple frames. Again, although the example illustrated in FIGS. 3A-3C is described with respect to CPU 6, the example techniques may be performed by GPU 12 as well.

Figure 4:
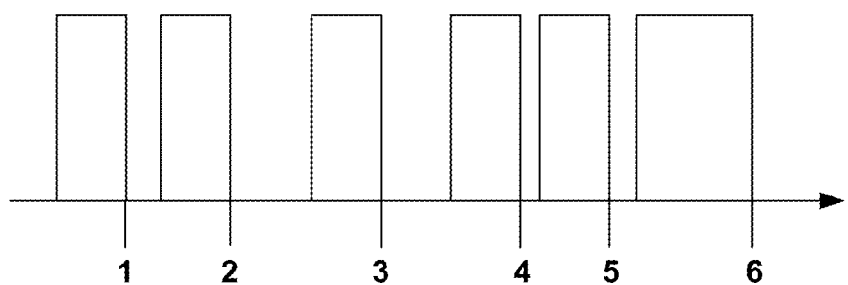
FIG. 4 is a timing diagram illustrating another example of a GPU receiving commands for rendering frames.

FIG. 4 is a timing diagram illustrating another example of GPU 12 receiving commands for rendering frames. FIG. 4 is used to illustrate why the techniques described in this disclosure reduce the latency of determining the clock rate of the clock signal that oscillator 34 outputs. The example is illustrated with respect to CPU 6 but may be performed by GPU 12 as well. To illustrate the reduction in latency, FIG. 4 is described with respect to CPU 6 determining the busy level percentage based on rendering only the current frame and described with respect to CPU 6 determining the busy level percentage by averaging the busy level percentages. Even if it is assumed that the time that GPU 12 becomes idle is the same as end of frame, relying on multiple frames to be rendered and then averaging delays the amount of time before the clock rate of GPU 12 can be set. It should be understood that idle time being right at the end-of-frame is not how the process actually works, but for illustration this assumption is made to ease with understanding.

In FIG. 4, there are six frames. The busy level (e.g., frame load) for the first five frames is 10 ms, and the busy level for the sixth frame is 15 ms. The frame interval (e.g., end-of-frame to end-of-frame which is assumed, solely for ease of understanding, to be same as idle-time to idle-time) for the first frame is 16 ms, the second frame is 12 ms, the third frame is 20 ms, the fourth frame is 20 ms, the fifth frame is 12 ms, and the sixth frame is 16 ms.

For this example, where CPU 6 uses only the busy time percentage of the current frame, CPU 6 may determine the average time interval for the first frame to be 16 ms ((16+16)/2) (assuming the initial frame time is 16 ms) and determine the busy time percentage for the first frame to be 63% (10/16). For the second frame, CPU 6 may determine the average time interval as 15 ms ((16+16+12)/3)), and determine the busy time percentage as 67% (10/15). For the third frame, CPU 6 may determine the average time interval as 16 ms ((16+16+12+20)/4)), and determine the busy time percentage as 63% (10/16). For the fourth frame, CPU 6 may determine the average time interval as 17 ms ((16+16+12+ 20+20)/5)), and determine the busy time percentage as 59% (10/17). For the fifth frame, CPU 6 may determine the average time interval as 16 ms ((16+16+12+20+20+12)/6)), and determine the busy time percentage as 63% (10/16). For the sixth frame, CPU 6 may determine the average time interval as 16 ms ((16+16+12+20+20+12+16)/7)), and determine the busy time percentage as 94% (15/16).

As seen in this example, although CPU 6 may determine the average of the time intervals, CPU 6 may use the busy level of only the current frame to determine the busy time percentage. For instance, CPU 6 may use the most current frame utilization instead of a moving average. In some examples, a user mode driver (UMD) may assist kernel device driver (e.g., graphics driver 28) with frame boundary information (e.g., end-of-frame) which enables CPU 6 to determine GPU 12 workload at the frame boundary.

In this example, assume that five previous frames all had a sample busy percentage of 63%. Also, assume that the five previous frames are used to determine the average busy percentage. For the case where CPU 6 wait for idle times of GPU 12, for the first frame, CPU 6 may determine the busy level percentage as 63% (10/16) and determine the average busy level percentage as 63% (e.g., (63+63+63+63+63)/ 5=63). For the second frame, CPU 6 may determine the busy level percentage as 83% (10/12) and determine the average busy level percentage as 67% (e.g., (63+63+63+63+83)/ 5=67). For the third frame, CPU 6 may determine the busy level percentage as 50% (10/20) and determine the average busy level percentage as 65% (e.g., (63+63+63+83+50)/ 5=64.4). For the fourth frame, CPU 6 may determine the busy level percentage as 50% (10/20) and determine the average busy level percentage as 62% (e.g., (63+63+83+ 50+50)/5=61.8). For the fifth frame, CPU 6 may determine the busy level percentage as 83% (10/12) and determine the average busy level percentage as 66% (e.g., (63+83+50+ 50+83)/5=65.8). For the sixth frame, CPU 6 may determine the busy level percentage as 94% (15/16) and determine the average busy level percentage as 72% (e.g., (83+50+50+ 83+94)/5=72).

Figure 5:
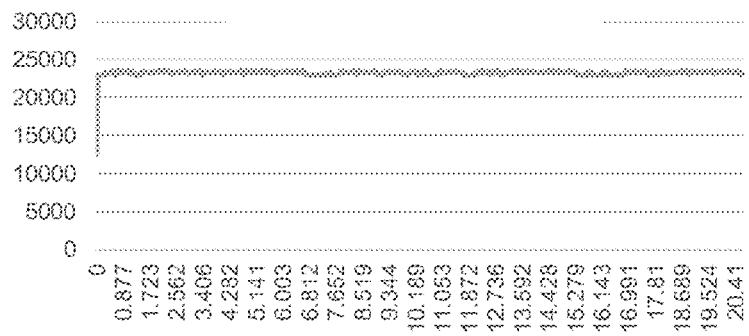
FIG. 5 is a graph illustrating number of commands a GPU is to execute over a period of time.

FIG. 5 is a graph illustrating number of commands a GPU is to execute over a period of time. In the example of FIG. 5, the frame rate is 30 frames per second, and as illustrated the frame load, from which the busy level can be derived, of GPU 12 is approximately constant at 24,000.

Figure 6A:
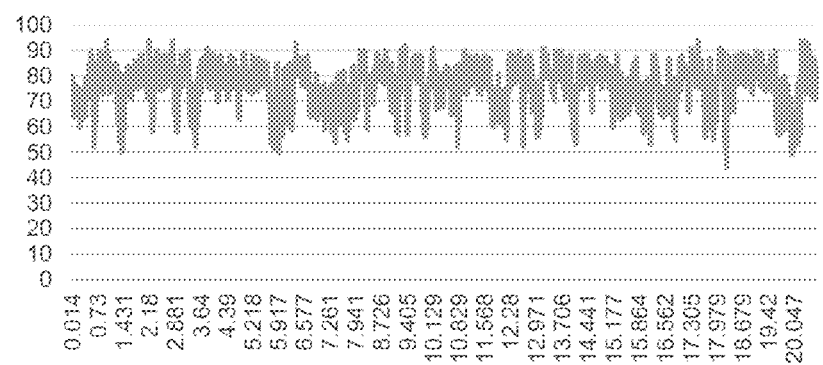
FIG. 6A is a graph illustrating a busy level percentage determination over the period of time illustrated in FIG. 5 utilizing one example technique.
Figure 6B:
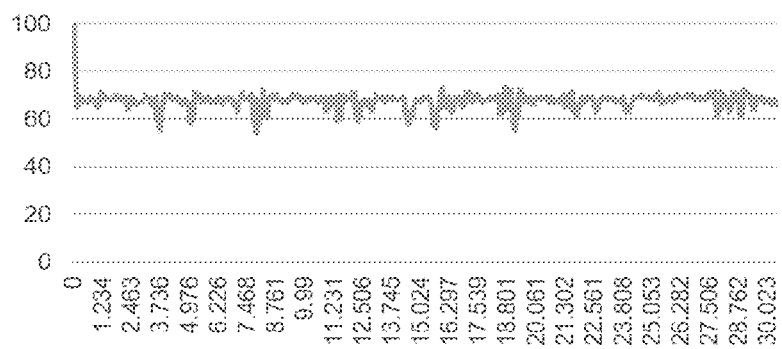
FIG. 6B is a graph illustrating a busy level percentage determination over the period of time illustrated in FIG. 5 utilizing another example technique.

FIG. 6A is a graph illustrating a busy level percentage determination over the period of time illustrated in FIG. 5 utilizing one example technique. FIG. 6B is a graph illustrating a busy level percentage determination over the period of time illustrated in FIG. 5 utilizing another example technique. In the example of FIG. 6A, CPU 6 and/or GPU 12 may determine the clock rate of the clock signal of oscillator 34 based on the idle-to-idle time of GPU 12, and in the example of FIG. 6B, CPU 6 and/or GPU 12 may determine the clock rate of the clock signal of oscillator 34 based on the end-of-frame to end-of-frame. As illustrated, in FIG. 6A, the clock rate fluctuates. However, in FIG. 6B, the clock rate is fairly constant.

Figure 7:
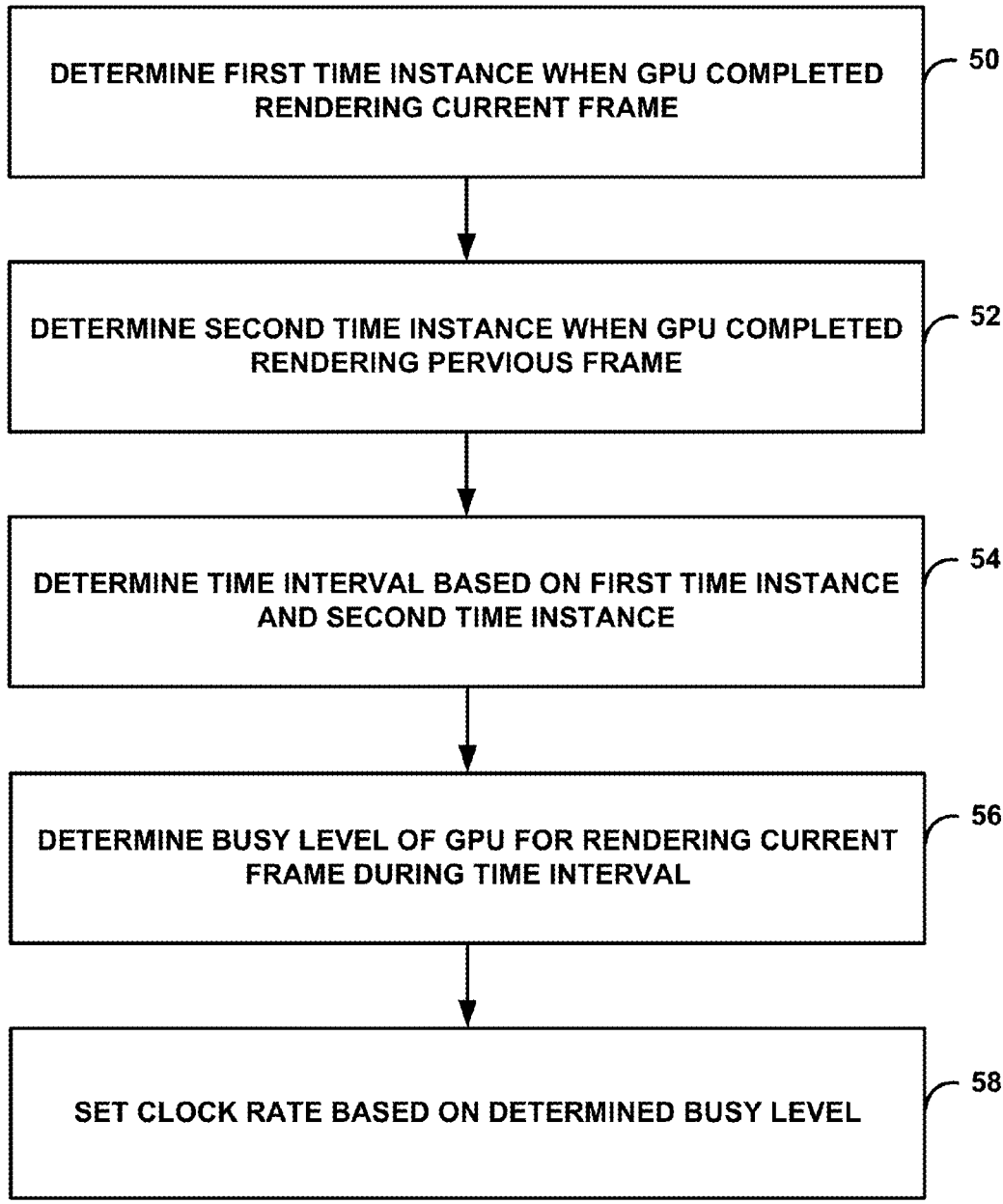
FIG. 7 is a flowchart illustrating an example method of clock rate determination according to techniques described in this disclosure.

FIG. 7 is a flowchart illustrating an example method of clock rate determination according to techniques described in this disclosure. As described, the example techniques may be performed by CPU 6, GPU 12, or a combination of CPU 6 and GPU 12. Accordingly, FIG. 7 is described with respect to a processor. One example of the processor is CPU 6, one example of the processor is GPU 12, and one example of the processor is a combination of CPU 6 and GPU 12.

As illustrated, a processor (e.g., CPU 6 and/or GPU 12) determines a first time instance when GPU 12 completed rendering a first frame (50). The first time instance comprises the instance when GPU 12 determined pixel values of a last pixel of the first frame or the instance when GPU 12 outputted the pixel values of the last pixel of the first frame. The processor determines a second time instance when GPU 12 completed rendering a second frame that immediately precedes the current frame (52). The second time instance comprises the instance when GPU 12 determined pixel values of a last pixel of the second frame or the instance when GPU 12 outputted the pixel values of the last pixel of the second frame.

In some cases, GPU 12 is idle for at least a portion during the rendering of the first frame. Also, in some cases, GPU 12 beings rendering the first frame immediately after completion of rendering the second frame such that there is no GPU idle time between rendering the second frame and rendering the first frame. CPU 6 receives a request for memory for rendering a next frame, and CPU 6 determines the first time instance in response to receiving the request for the memory for rendering the next frame.

The processor determines a time interval based on the first time instance and the second time instance (54). The processor determines a busy level of GPU 12 for rendering the first frame during the time interval (56). Based on the determined busy level, the processor may set a clock rate of GPU 12 (58).

In some examples, the processor determines a clock rate of GPU 12 based on the determined busy level, and the processor sets the clock rate of GPU 12 based on the determined clock rate. For instance, CPU 6 may instruct controller 30 to set the clock rate of oscillator 34 or controller 30 may directly set the clock rate of oscillator 34. The processor may determine the clock rate for GPU 12 based on the determined busy level for rendering the first frame and no other frame.

In some examples, the processor may determine a busy level percentage based on the determined busy level and the determined time interval, compare the busy level percentage to a threshold, and determine the clock rate based on the comparison. In some examples, the processor may average the time interval and one or more previous time intervals to determine an average time interval, each of the one or more previous time intervals indicating time intervals between completion of rendering of respective previous frames. The processor may determine a busy level percentage based on the determined busy level and the average time interface, may compare the busy level percentage to a threshold, and determine the clock rate based on the comparison.

In one or more examples, the functions described may be implemented in hardware, software, firmware, or any combination thereof. If implemented in software, the functions may be stored on, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of clock rate determination comprising:
   determining, with a processor, a first time instance when a graphics processing unit (GPU) completed rendering a first frame;
   determining, with the processor, a second time instance when the GPU completed rendering a second frame that immediately precedes the first frame;
   determining, with the processor, a time interval based on the first time instance and the second time instance;
   determining, with the processor, a busy level of the GPU for rendering the first frame during the time interval, wherein the GPU is idle for at least a portion during the rendering of the first frame; and
   setting a clock rate of the GPU based on the determined busy level.

2. The method of claim 1, wherein the first time instance comprises the instance when the GPU determined pixel values of a last pixel of the first frame or the instance when the GPU outputted the pixel values of the last pixel of the first frame, and wherein the second time instance comprises the instance when the GPU determined pixel values of a last pixel of the second frame or the instance when the GPU outputted the pixel values of the last pixel of the second frame.

3. The method of claim 1, further comprising:
   determining a clock rate of the GPU based on the determined busy level,
   wherein setting the clock rate comprises setting the clock rate to the determined clock rate.

4. The method of claim 1, wherein the GPU begins rendering the first frame immediately after completion of rendering the second frame such that there is no GPU idle time between rendering the second frame and rendering the first frame.

5. The method of claim 1, further comprising:
determining a busy level percentage based on the determined busy level and the determined time interval;
comparing the busy level percentage to a threshold; and
determining the clock rate based on the comparison,
wherein setting the clock rate comprises setting the clock rate of the GPU based on the determined clock rate.

6. The method of claim 1, further comprising:
averaging the time interval and one or more previous time intervals to determine an average time interval, each of the one or more previous time intervals indicating time intervals between completion of rendering of respective previous frames;
determining a busy level percentage based on the determined busy level and the average time interval;
comparing the busy level percentage to a threshold; and
determining the clock rate based on the comparison,
wherein setting the clock rate comprises setting the clock rate of the GPU based on the determined clock rate.

7. The method of claim 1, further comprising:
determining the clock rate of the GPU based on the determined busy level for rendering the first frame and no other frame.

8. The method of claim 1, further comprising:
receiving, from the GPU, a request for memory for rendering a next frame,
wherein determining the first time instance comprises determining the first time instance in response to receiving the request for the memory for rendering the next frame.

9. The method of claim 1, wherein the processor comprises a host processor, and wherein setting the clock rate comprises instructing, with the host processor, the GPU to set the clock rate.

10. The method of claim 1, wherein the processor comprises the GPU.

11. A device for clock rate determination comprising:
memory configured to store graphics data that is used by a graphics processing unit (GPU) for rendering a first frame and a second frame; and
a processor comprising integrated circuitry, the processor configured to:
determine a first time instance when the GPU completed rendering the first frame;
determine a second time instance when the GPU completed rendering the second frame;
determine a time interval based on the first time instance and the second time instance;
determine a busy level of the GPU for rendering the first frame during the time interval, wherein the GPU is idle for at least a portion during the rendering of the first frame; and
set a clock rate of the GPU based on the determined busy level.

12. The device of claim 11, wherein the first time instance comprises the instance when the GPU determined pixel values of a last pixel of the first frame or the instance when the GPU outputted the pixel values of the last pixel of the first frame, and wherein the second time instance comprises the instance when the GPU determined pixel values of a last pixel of the second frame or the instance when the GPU outputted the pixel values of the last pixel of the second frame.

13. The device of claim 11, wherein the processor is configured to determine a clock rate of the GPU based on the determined busy level, and wherein to set the clock rate, the processor is configured to set the clock rate to the determined clock rate.

14. The device of claim 11, wherein the GPU begins rendering the first frame immediately after completion of rendering the second frame such that there is no GPU idle time between rendering the second frame and rendering the first frame.

15. The device of claim 11, wherein the processor is configured to:
determine a busy level percentage based on the determined busy level and the determined time interval;
compare the busy level percentage to a threshold; and
determine the clock rate based on the comparison,
wherein to set the clock rate, the processor is configured to set the clock rate based on the determined clock rate.

16. The device of claim 11, wherein the processor is configured to:
average the time interval and one or more previous time intervals to determine an average time interval, each of the one or more previous time intervals indicating time intervals between completion of rendering of respective previous frames;
determine a busy level percentage based on the determined busy level and the average time interval;
compare the busy level percentage to a threshold; and
determine the clock rate based on the comparison,
wherein to set the clock rate, the processor is configured to set the clock rate based on the determined clock rate.

17. The device of claim 11, wherein the processor is configured to determine the clock rate of the GPU based on the determined busy level for rendering the first frame and no other frame.

18. The device of claim 11, wherein the processor is configured to:
receive, from the GPU, a request for memory for rendering a next frame,
wherein to determine the first time instance, the processor is configured to determine the first time instance in response to receiving the request for the memory for rendering the next frame.

19. The device of claim 11, wherein the processor comprises a host processor, and wherein to set the clock rate, the host processor is configured to instruct the GPU to set the clock rate.

20. The device of claim 11, wherein the processor comprises the GPU.

21. A non-transitory computer-readable storage medium storing instructions that when executed cause one or more processors to:
determine a first time instance when a graphics processing unit (GPU) completed rendering a first frame;
determine a second time instance when the GPU completed rendering a second frame that immediately precedes the first frame;
determine a time interval based on the first time instance and the second time instance;
determine a busy level of the GPU for rendering the first frame during the time interval, wherein the GPU is idle for at least a portion during the rendering of the first frame; and set a clock rate of the GPU based on the determined busy level of the GPU.

22. The non-transitory computer-readable storage medium of claim 21, wherein the first time instance comprises the instance when the GPU determined pixel values of a last pixel of the first frame or the instance when the GPU outputted the pixel values of the last pixel of the first frame, and wherein the second time instance comprises the instance when the GPU determined pixel values of a last pixel of the second frame or the instance when the GPU outputted the pixel values of the last pixel of the second frame.

23. The non-transitory computer-readable storage medium of claim 21, further comprising instructions that cause the one or more processors to:
   determine a clock rate of the GPU based on the determined busy level,
   wherein the instructions that cause the one or more processors to set the clock rate comprise instructions that cause the one or more processors to set the clock rate to the determined clock rate.

24. The non-transitory computer-readable storage medium of claim 21, wherein the one or more processors comprise a host processor.

25. A device for clock rate determination comprising:
   means for determining a first time instance when a graphics processing unit (GPU) completed rendering a first frame;
   means for determining a second time instance when the GPU completed rendering a second frame that immediately precedes the first frame;
   means for determining a time interval based on the first time instance and the second time instance;
   means for determining a busy level of the GPU for rendering the first frame during the time interval, wherein the GPU is idle for at least a portion during the rendering of the first frame; and
   means for setting a clock rate of the GPU based on the determined busy level.

26. The device of claim 25, wherein the first time instance comprises the instance when the GPU determined pixel values of a last pixel of the first frame or the instance when the GPU outputted the pixel values of the last pixel of the first frame, and wherein the second time instance comprises the instance when the GPU determined pixel values of a last pixel of the second frame or the instance when the GPU outputted the pixel values of the last pixel of the second frame.

27. The device of claim 25, further comprising:
   means for determining a clock rate of the GPU based on the determined busy level,
   wherein the means for setting the clock rate comprises means for setting the clock rate to the determined clock rate.

* * * * *